(12) United States Patent
Spellman

(10) Patent No.: US 7,810,880 B2
(45) Date of Patent: Oct. 12, 2010

(54) VEHICLE SEAT MOUNT EQUIPMENT RACK

(76) Inventor: Edward F. Spellman, 39056 Arbor Ct., Grafton, OH (US) 44044

( * ) Notice: Subject to any disclaimer, the term of this patent is extended or adjusted under 35 U.S.C. 154(b) by 574 days.

(21) Appl. No.: 10/566,798

(22) PCT Filed: Jul. 29, 2004

(86) PCT No.: PCT/US2004/024365
§ 371 (c)(1), (2), (4) Date: Jan. 31, 2006

(87) PCT Pub. No.: WO2005/011353
PCT Pub. Date: Feb. 10, 2005

(65) Prior Publication Data
US 2006/0226322 A1   Oct. 12, 2006

Related U.S. Application Data

(60) Provisional application No. 60/491,390, filed on Jul. 31, 2003.

(51) Int. Cl.
*A47C 7/62* (2006.01)
(52) U.S. Cl. ...................... 297/188.06; 224/275; 108/44
(58) Field of Classification Search ................. 248/690, 248/238, 215, 250, 307, 340; 211/90.02, 211/106.01, 134; 108/44; 297/188.04, 188.06, 297/217.3, 217.4; 296/24.44, 1.07; 224/275, 224/449, 458, 560, 42.11, 572
See application file for complete search history.

(56) References Cited

U.S. PATENT DOCUMENTS

| 207,804 A | 9/1878 | Gunther |
| 2,067,661 A | 1/1937 | Ferrelle |
| 2,299,025 A | 10/1942 | McGinley |
| 2,649,972 A | 8/1953 | Weil |
| 2,678,249 A | 5/1954 | Rhoads |
| 2,768,043 A | 10/1956 | Kristoff et al. |
| 2,818,317 A | 12/1957 | Little, Jr. |

(Continued)

FOREIGN PATENT DOCUMENTS

GB    2238993 A   *   6/1991

OTHER PUBLICATIONS

RCA (Thompson) DVD/CD/MP3 player model No. BLD774, as viewed on an RCA website (www.rca.com), Jul. 14, 2004, two page printout.

(Continued)

*Primary Examiner*—A. Joseph Wujciak, III
(74) *Attorney, Agent, or Firm*—D. A. Stauffer

(57) ABSTRACT

A vehicle equipment rack and methods for removably holding equipment on a shelf that is removably and preferably releasably mounted within a vehicle. A hook bar assembly has a guide portion, and at least one sliding portion telescopically engaged with the guide portion. The hook bar assembly is attached to the shelf. Two end hooks are on distal longitudinally outward ends of the hook bar assembly, and each end hook is configured for hooking on a headrest post of the vehicle. The end hooks may have hooks that open forward, rearward, or outward and are biased with respect to each other. Preferably, a hook portion is releasably attached to the hook bar assembly for releasing in response to a laterally directed force.

21 Claims, 6 Drawing Sheets

U.S. PATENT DOCUMENTS

| | | | |
|---|---|---|---|
| 2,984,443 | A | 5/1961 | Bergengren |
| 2,996,193 | A | 8/1961 | Olson |
| 3,032,779 | A | 5/1962 | Titley |
| 3,071,728 | A | 1/1963 | Grace et al. |
| 3,097,884 | A | 7/1963 | Alford |
| 3,221,678 | A | 12/1965 | Doherty |
| 4,564,548 | A * | 1/1986 | Fast ........................ 428/121 |
| 4,665,559 | A * | 5/1987 | Benun ....................... 725/151 |
| 5,201,677 | A * | 4/1993 | Takayama ................. 439/668 |
| 5,370,060 | A | 12/1994 | Wang |
| 5,582,377 | A * | 12/1996 | Quesada ................ 248/229.12 |
| 5,673,464 | A * | 10/1997 | Whittaker ..................... 24/301 |
| 6,231,017 | B1 * | 5/2001 | Watkins ................... 248/274.1 |
| 6,315,180 | B1 | 11/2001 | Watkins |
| 6,327,993 | B1 * | 12/2001 | Richens, Jr. ................ 114/361 |
| 6,330,337 | B1 | 12/2001 | Nicholson et al. |
| 6,502,900 | B1 * | 1/2003 | Johnston ................ 297/188.06 |
| 6,503,019 | B1 * | 1/2003 | Wang ...................... 403/109.1 |
| 6,607,241 | B2 * | 8/2003 | Johnston ................ 297/188.06 |
| 2002/0157431 | A1 | 10/2002 | Lurie et al. |
| 2002/0175254 | A1 | 11/2002 | Lee |
| 2003/0038514 | A1 | 2/2003 | Johnston |
| 2003/0057747 | A1 * | 3/2003 | Johnston ................ 297/188.06 |
| 2003/0150892 | A1 * | 8/2003 | Hoe ........................... 224/275 |

OTHER PUBLICATIONS

Kwik Klip (patent pending) DVD Vehicle Mounting Bracket for Portable DVD Players; as viewed on the MITO Corporation's marketing website (www.mitocorp.com), Jul. 14, 2004, seven page printout.

Suspension Theater™ (patent pending, trademark registered to CFS Products, LLC) as viewed on the MITO Corporation's marketing website (www.mitocorp.com, plus a link therefrom to a PDF installation manual), Jul. 14, 2004, eight page printout.

U.S. Appl. No. 10/943,708, Sep. 17, 2004, Newman.

* cited by examiner

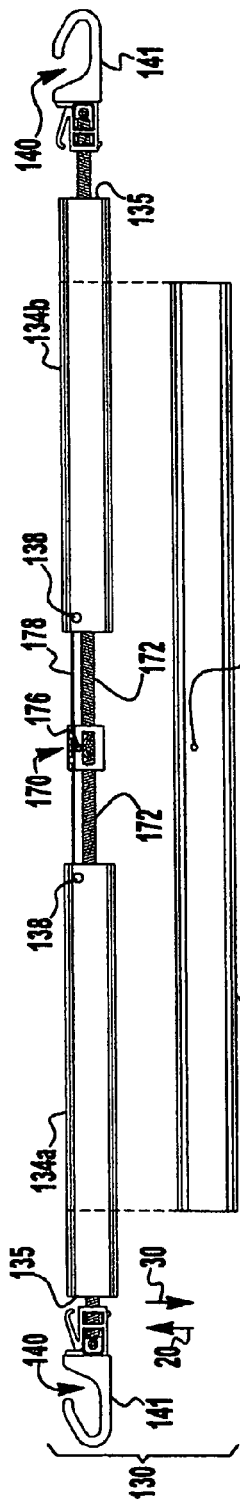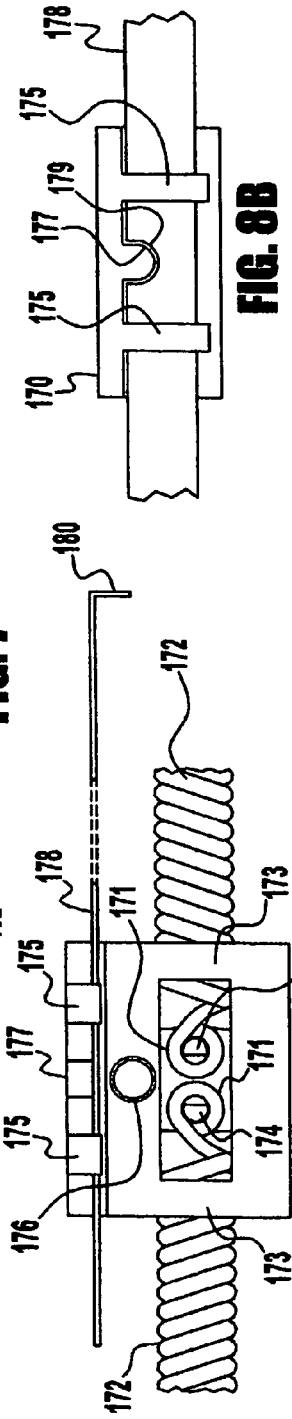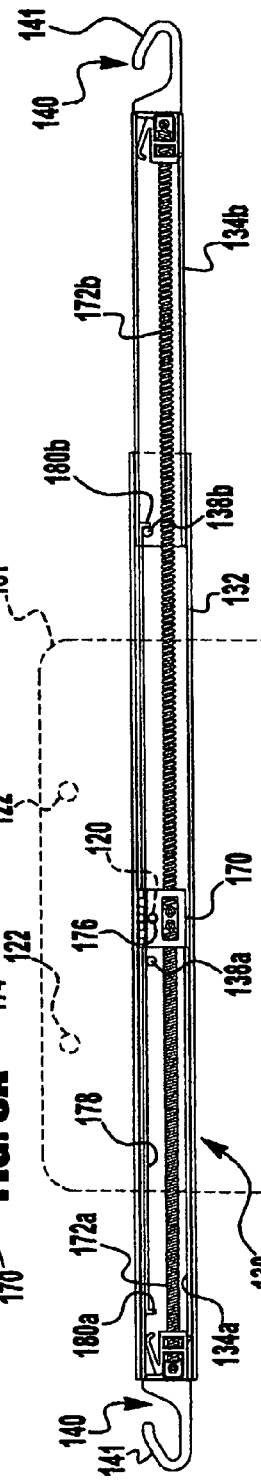

VEHICLE SEAT MOUNT EQUIPMENT RACK

CROSS-REFERENCE TO RELATED APPLICATIONS

This application claims the benefit of U.S. Provisional Patent Application No. 60/491,390, filed 31 Jul. 2003 by Edward Spellman,

TECHNICAL FIELD OF THE INVENTION

The present invention relates to equipment racks for vehicles, and, more particularly to equipment racks that removably mount onto vehicle seats, and, most particularly to equipment racks that removably mount onto headrest supports of the seats in a vehicle.

BACKGROUND OF THE INVENTION

Entertaining children while a family is traveling in a vehicle such as a car or van, has been made easier with the development of audiovisual equipment suitable for placement in vehicles smaller than a bus or RV (recreational vehicle). It is known to place a small portable TV, optionally with an associated videotape player in a vehicle. Although such equipment can be built-in to a vehicle, this is quite expensive, and is only feasible for larger vehicles (e.g., RV or large conversion van). Newer, small video players and/or display screens (e.g., DVD players) can be built into the ceiling, dashboard, or seatbacks of vehicles, but this is also expensive, and many would prefer to have a portable player that is not permanently part of a single vehicle. Another solution is to place the equipment on a seat, or to balance it on the console/armrest between the front seats, but this presents the dangerous possibility of heavy objects flying around the vehicle during sudden stops or accidents. Thus various racks and systems have been created to hold portable equipment by fixedly or removably attaching the equipment to a rack that is permanently, or preferably removably, mounted within the vehicle, preferably in a position to be viewed by one or more occupants of rear seats in the vehicle's passenger compartment.

The prior art contains numerous examples of racks for mounting food trays, work/play surfaces radio equipment, etc. within the passenger compartment of vehicles. For example, U.S. Pat. No. 3,071,728 (Grace, et. al; 1963) discloses a folding shelf/bracket attached to a car dashboard for removably holding a portable auto radio receiver. For example, U.S. Pat. No. 3,032,779 (Titley; 1962) discloses a shelf (98) that mounts on the back of an auto seat by means of attachment clips or sockets screwed into the seat back. For example, U.S. Pat. No. 2,067,661 (Ferrelle; 1937) discloses a shelf (20) extending between auto window sills (hooking into window slots), or a shelf(31) mounted on a seatback using brackets (29) that are screw-attached to the seat top/back in order to provide slots for L-hook support brackets (30). For example, U.S. Pat. No. 2,678,249 (Rhoads; 1954) discloses a shelf (10) suspended from two "spring arms" (13, 14) that are pivotably engaged with brackets attached to either side of a vehicle ceiling. The spring arms are not described adequately to determine the nature of the springiness. The length of the spring arm is adjusted with a turnbuckle (22). In the down position, the shelf rests on the top of a front bench seat, held in place by the spring arms. For example, U.S. Pat. No. 2,818,317 (Little, Jr.; 1957) discloses an automobile hanging desk or table comprising a shelf that is suspended from a telescoping square rod assembly (165) that presses outward against sides of the car ceiling. A solid rod (22) slides within tubes on either end, and knurled nuts (24) engage with threads on the solid rod to press outward when tuned.

With the advent of front seat headrests (head restraints), particularly ones that are height-adjustable by using support posts, a convenient new means for attaching vehicle equipment racks became available.

U.S. Pat. No. 6,231,017 (Watkins; 2001) discloses a mount bar (10) for video recording and display devices. The mount bar (10) is attached at distal ends to headrest posts (24) and extends between two front seats (28) of the vehicle. The disclosed display equipment includes a monitor (46, e.g., a TV) and optionally a VCR (52) that are attached to a shelf (44) that is suspended below the mount bar in a frame (30) positioned between the seats. In column 3, lines 18-23, the description states that the display is secured to the shelf (44) by means of threaded fasteners (50) or straps (not illustrated). FIGS. 3, 4, and 5 (described in columns 4-6) show telescopically connected multiple-tube mount bars, all bolted together to achieve a rigid, fixed-length bar that is then bolted to the headrest posts using bolts (118) and brackets (110).

It appears that for much of the prior art, and in particular for the rigid mount bar of Watkins '017, there is a risk of injury to rear seat occupants who may be thrown forward against it in sudden or accidental stops. Furthermore, it appears that installation and removal of devices such as the Watkins '017 mount bar is likely to be inconvenient and time consuming, if not difficult.

With the advent of small flat screen displays (e.g., LCD), and especially with the availability of small storage media (e.g., DVD discs) and accompanying players like the now readily available DVD players for a wide selection of DVD recorded movies, vehicle equipment racks can become correspondingly smaller and more convenient. Although the DVD players are small enough to be handheld or placed in a lap of an individual viewer, where multiple viewers are involved, and/or when one or more children are to be the viewers, then convenient, safe and secure mounting of the player is most desirable. A further concern is security, in that a mounted player should be easily and quickly removable for secure and/or hidden storage (e.g., in a car trunk) whenever the vehicle is left unattended. Also, especially when children are involved, front seat occupants should be able to see and reach back seat occupants without interference by the equipment rack, and it is desirable that the front seat occupant be able to access the player in the rack for the purpose of controlling its operation. A further concern is preservation of unobstructed rear-view mirror visibility for the driver.

US Patent Application Publication No. US 2002/0175254 (Lee; 2002) discloses an adjustable monitor bracket for attaching to both poles (44) of a single headrest (42) by means of bolted-on T-shaped blocks (16, 18). The bracket has a fixed bar (10) extending from the headrest to a pivot point between the seats. A movable adjustable bar (20) is pivotably attached at one end to the fixed bar, and has a tray (24) at the other end. A fastener (242) is pivotably and rotatably attached to the tray and has a fastening screw (244) for removably attaching a monitor (50, e.g., LCD screen). Safety provisions include rubber padding (not numbered) and pivoting in response to impact, wherein the pivoting amount is limited by a stop (60).

In addition to the above patent prior art, the inventor is aware of at least three different commercially available methods for addressing many of the above-described concerns as embodied in removable (non-built-in) vehicle equipment holders: a seat-top player, a console-mount system, and a seat suspension bag system All of these systems, however, suffer from limitations that are addressed by the present invention.

The RCA (Thompson) DVD/CD/MP3 player model number BLD774, as viewed on an RCA website (www.rca.com), is a nine pound portable player with a built-in handle. When used in a vehicle, the player rests on the center portion of a bench se is apparently held in place by the center lap belt which is passed through the back of the player, and the display screen folds up on a hinge at the front end near the front edge of the seat.

The Kwik Klip (patent pending) DVD Vehicle Mounting Bracket for Portable DVD Players; as viewed on the MITO Corporation's marketing website (www.mitocorp.com) provides a bracket that angles upward from where it is attached to a center floor console between front bucket seats in selected vehicles having suitable consoles. The vehicle specific bracket is said to install in less than 10 minutes and apparently removably clips onto the bottom of a portable DVD player.

The Suspension Theater™ (patent pending, trademark registered to CFS Products, LLC) as viewed on the MITO Corporation's marketing website (www.mitocorp.com, plus a link therefrom to an 11 page installation manual) comprises a main storage case, a player wallet/suspension platform, suspension straps, and a shoulder carrying strap. The main storage case is a portable carrying case that contains the other items plus a user-supplied portable DVD player (limited by the size of the case). The installation manual details three 9 step procedures for removably installing the platform and player "in minutes" in "virtually any vehicle": (a) between two bucket seats, (b) behind a single bucket seat, and (c) behind a bench seat. In each case, the platform is arranged in a triangular form and then suspended from the seat top(s) by straps that in most cases encircle the headrest(s). Additional straps secure the platform to a "bar, rod, or fixture" of the car that must be found below the seat. The securing straps are said to "keep up and down bouncing to a minimum," but the platform "will not be completely free from slight swaying." Once the platform is suspended and secured, the player's base is held on the platform by a lower L-shaped bracket and an upper Velcro strap. Optionally, self-adhesive Velcro strips can be adhered to the bottom of the player for providing added adherence to the Velcro receptive platform surface. Notice is given that: "some portable players with displays that do not open to a full 180 degrees will ONLY allow a proper viewing angle when suspended between two front seats." Caution notices include the following: "Once the suspension platform is adjusted and secured, use caution when moving the seat it is attached to. Excessive movement may damage the straps, plastic swivel snaps, or even the suspension case."

It can be seen from examination of the abovementioned prior art that various means are disclosed for attachment or mounting of vehicle equipment racks within the vehicle. Additional potentially relevant prior art racks or shelves and their attachment means, particularly means for attachment of a shelf to a vertical post, are disclosed in the following U.S. Pat. No. 6,330,337 (Nicholson, et al.; 2001); U.S. Pat. No. 6,315,180 (Watkins; 2001); U.S. Pat. No. 3,221,678 (Doherty; 1965); U.S. Pat. No. 3,097,884 (Alford, 1963); U.S. Pat. No. 2,996,193 (Olson; 1959); U.S. Pat. No. 2,984,443 (Bergengren; 1961); U.S. Pat. No. 2,768,043 (Kristoff et. al.; 1956); U.S. Pat. No. 2,649,972 (Weil; 1953); U.S. Pat. No. 2,299,025 (McGinley; 1942); U.S. Pat. No. 207,804 (Gunther; 1878); and the US Patent Application Publication No. US 2002/0157431 (Lurie, et al.; 2002). Of interest among these references is Alford '884 which discloses a lever-operated hook for clamping around a post; and Weil '972 which discloses a shelf between two substantially vertical parallel support posts. The Weil '972 shelf has a U-shaped jaw at each back corner, with the U opening laterally outward to partially encircle a post. The shelf is a semi-rigid flexible plate that is normally bowed slightly upward such that weight on the shelf flattens it and pushes the jaws outward to press against the posts for friction. Since the shelf is cantilevered forward, the weight also twists the jaws to cause the front and rear edges of the jaw to bite into the post, thereby preventing vertical sliding. In order to remove the Weil '972 shelf from its supporting posts, the cantilevered weight must be relieved and the shelf must be tilted such that one jaw slides up and the other jaw slides down its respective post sufficiently to cause one jaw to un-encircle its post. It should be apparent that vertical clearance between a headrest and a seatback may not be sufficient to enable a similarly-designed rack to be attached or removed from a headrest post.

All of the abovedescribed prior art racks have limitations in their ability to satisfactorily mount equipment in vehicles. It is a general object of the present invention to overcome those limitations. Subsidiary objects include making the inventive equipment rack: adaptable for installation in virtually any vehicle with adjustable headrests on the front seat(s); simple and fast to install or remove (in seconds, not minutes); stable with a minimum of rattling and/or jiggling or other movement; unobstructive of the driver's rear view mirror line of sight and of the front seat occupants' view and access to rear seat occupants; with enhanced safety features for passengers in case of sudden stops; unaffected by most movements of the front seats after installation; compact and lightweight; collapsible for storage; pivotable for positioning of an attached viewing screen; and adaptable for holding a wide variety of commonly available players, particularly folding screen DVD players and the like. Other objects of the invention may become apparent in light of the present specification.

BRIEF SUMMARY OF THE INVENTION

According to the invention, a vehicle equipment rack for removably holding equipment on a shelf that is removably mounted within a vehicle is characterized by: a hook bar assembly having a guide portion, and at least one sliding portion telescopically engaged with the guide portion, wherein the hook bar assembly is attached to the shelf, and two end hooks on distal longitudinally outward ends of the hook bar assembly, wherein each end hook is configured for hooking on a headrest post of the vehicle.

According to the invention, the vehicle equipment rack is further characterized by a manual locking device for holding the hook bar assembly in a fixed telescopic position, and/or by a spring connected for biasing the two end hooks with respect to each other.

According to the invention, the vehicle equipment rack is further characterized in that the end hook has a forward opening hook with inside walls including: a longitudinally straight shank wall that extends longitudinally outward; and a straight finger wall that extends from the longitudinally outward end of the shank wall, and that is angled forward and longitudinally inward relative to the shank wall. Preferably a longitudinal straight tip wall extends longitudinally inward from the forward end of the finger wall.

According to the invention, the vehicle equipment rack is further characterized in that the end hook has a rearward opening hook with inside walls including: a longitudinally straight shank wall that extends longitudinally outward; and a straight finger wall that extends from the longitudinally outward end of the shank wall, and that is angled rearward and longitudinally inward relative to the shank wall. Preferably an anti-rotation bar extends longitudinally outward from the rearward opening hook such that a bar wall is parallel to, and approximately collinear with, the shank wall, wherein the anti-rotation bar is dimensioned to be long enough to reach at least longitudinally outward of an outside headrest post when the rearward opening hook is hooked on an inside headrest post.

According to the invention, the vehicle equipment rack is further characterized in that the end hook has a outward opening hook with inside walls including: a forward finger wall that extends forward and longitudinally outward, and a rearward finger wall that extends rearward and longitudinally outward; wherein the forward finger wall and the rearward finger wall are both straight, and are angled relative to each other.

According to the invention, the vehicle equipment rack is further characterized by: a socket on the hook bar assembly that opens longitudinally outward; a latch hole in a lateral inside surface of the socket; a hook portion of the end hook; a peg portion of the end hook extending longitudinally inward from the hook portion, wherein the peg portion is configured to fit within the socket; a flange of the hook portion where the hook portion joins the peg portion, wherein the flange is laterally dimensioned larger than the socket; a shoulder of the peg portion adjacent to the flange wherein the shoulder is laterally dimensioned to closely fit within the socket; a first lateral wall of the peg portion that is recessed relative to the socket; a peg spring extending from the first lateral wall, and configured for biasing apart the first lateral wall and the socket when the peg portion is positioned in the socket; and a protrusion extending laterally from a second lateral wall of the peg portion that is laterally opposed to the first lateral wall, wherein the protrusion is dimensioned and shaped for mating with, and catching in, the latch hole of the socket, and the latch hole is positioned to catch the protrusion when the peg portion is inserted into the socket such that the flange abuts against the socket. Preferably, there is also a beveled edge between the end hook and the socket for allowing the peg portion to be tilted sufficiently to lever the protrusion clear of the latch hole. Preferably, there is also a spring that is connected for biasing the peg portion longitudinally inward into the socket. Further preferably, the end hook has a forward opening hook portion; the first lateral wall of the peg portion faces forward; the second lateral wall of the peg portion faces rearward; and a spring is connected for biasing the end hook longitudinally inward. Even further preferably, the shelf is attached to the guide portion; the guide portion is a tube having a rectangular cross-section; two sliding portions are the two distal longitudinally outward ends of the hook bar assembly; and both of the two sliding portions have rectangular cross sections and are telescopically engaged for sliding longitudinally within the guide portion. Even further preferably, the two sliding portions are tubular; and one socket is within the longitudinally outward end of each of the two sliding portions. Preferably, there are also rectangular cross-sections for the guide portion and the sliding portions wherein the fore-aft dimension is larger than the top-bottom dimension. Preferably, a limit pin is secured near a longitudinal inward end of each of the sliding portions; and an extension limiter has limit hooks that are cooperatively engaged with the limit pins for limiting outward extension of the sliding portions.

According to the invention, the vehicle equipment rack is further characterized by: a limit pin that is secured in one of the sliding portion and the guide portion; and an extension limiter with limit hooks that is attached to the other one of the sliding portion and the guide portion, and that is cooperatively engaged with the limit pin for limiting outward extension of the sliding portion.

According to the invention, the vehicle equipment rack is further characterized by: a tolerance bump that extends between the guide portion and the at least one sliding portion.

According to the invention, the vehicle equipment rack is further characterized by: a pivoting connection of the shelf to the hook bar assembly; and pivot stops for limiting the extent of shelf pivoting.

According to the invention, the vehicle equipment rack is further characterized by: a retaining post that protrudes upward near a forward edge of the shelf, an elastic cord (102) that is attached near a first side edge of the shelf (101) and has a knot (103) at an end of the elastic cord (102) that is removably caught in a cord notch (104) in a second side edge of the shelf (101) opposite to the first side edge, wherein the cord notch 104 opens outward at the second side edge; and a strap having a first end that is attached to a first side edge of the shelf and having a second end with hook-and-loop material that removably attaches to a fastening pad with a corresponding hook-and-loop material, wherein the fastening pad is affixed near the second side edge of the shelf.

According to the invention, the vehicle equipment rack is further characterized by: a non-slip top surface of the shelf, and/or a softened rearward edge of the shelf.

According to the invention, the vehicle equipment rack is further characterized by: a compressible sleeve removably hooked on the headrest post, and positioned between the end hook and a headrest supported by the headrest post.

According to the invention, the vehicle equipment rack is further characterized by: an audio transmitter attached to the shelf, and an audio cord that is connected between the audio transmitter and an audio plug for plugging into the equipment.

According to the invention, the vehicle equipment rack is further characterized by: a power jack module that is mounted on the shelf, and a power cord that is connected between the power jack module and a power plug for plugging into the equipment. Optionally the power jack module is further characterized by power conversion circuitry and/or power conditioning circuitry.

According to the invention, a method for removably mounting an equipment rack within a vehicle is characterized by the steps of: providing two end hooks on distal longitudinally outward ends of the rack; configuring each end hook for hooking on a headrest post of the vehicle; and employing the end hooks as sliding portions that are telescopically engaged with a guiding portion of the rack.

According to the invention, the method is further characterized by the step of biasing the two end hooks with respect to each other.

According to the invention, the method is further characterized by the step of shaping inside walls of the end hook for establishing two lines of contact between the end hook and the headrest post.

According to the invention, the method is further characterized by the steps of biasing the end hook longitudinally outward; and shaping the end hook for opening longitudinally outward. Preferably the method is further characterized by the step of providing V-shaped inside walls of the end hook for removably and releasably holding the rack on the headrest post.

According to the invention, the method is further characterized by the steps of: biasing the end hook longitudinally inward; and sloping an inside wall of the end hook forward and longitudinally inward for removably and releasably holding the rack on the headrest post.

According to the invention, the method is further characterized by the steps of: biasing the end hook longitudinally inward; and sloping an inside wall of the end hook rearward and longitudinally inward for removably and releasably holding the rack on the headrest post.

According to the invention, the method is further characterized by the steps of: providing a socket, a peg portion, and a hook portion at the longitudinally outward end of the end hook; extending the peg portion longitudinally inward from the hook portion; shaping the peg portion to releasably fit into the socket; laterally biasing the peg portion against the socket when the peg portion is in the socket; and providing a catch system that releases in response to tilting the peg portion in the socket.

According to the invention, the method is further characterized by the step of preventing rotation of the end hook (140) around a first headrest post (324) by extending a bar (166) from the end hook (140, 155) longitudinally outward to reach at least longitudinally outward of a second headrest post (322) when the end hook (140, 155) is hooked on the first headrest post (324).

According to the invention, the method is further characterized by the step of preventing undesirable movement of the sliding portion relative to the guiding portion by forming tolerance bumps between the sliding portion and the guiding portion after they have been telescopically engaged.

According to the invention, the method is further characterized by the step of preventing undesirable movement of the rack by removably hooking a compressible sleeve on the headrest post between the end hook and a headrest supported by the headrest post.

According to the invention, a method is disclosed for removably holding equipment on a shelf that is mounted within a vehicle wherein the mounting includes attaching the shelf to an approximately horizontal bar that is attached within the vehicle, and wherein the method is characterized by the steps of preventing horizontal movement of the equipment by providing one or more posts protruding upward from the shelf, and holding the equipment down on the shelf with a flexible strap that is removably attached to the shelf.

According to the invention, the method is further characterized by the step of trapping an approximately vertical portion of the equipment between the one or more posts and an elastic cord that is removably attached to the shelf.

According to the invention, the method is further characterized by the step of providing a non-slip top surface of the shelf.

Other objects, features and advantages of the invention may become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with identical or with similar numbers in a single drawing. For example, each of a plurality of elements collectively referred to as 199 may be referred to individually as 199*a*, 199*b*, 199*c*, etc. Such relationships, if any, between similar elements in the same or different figures will become apparent throughout the specification, including, if applicable, in the claims and abstract.

Figure 1A:
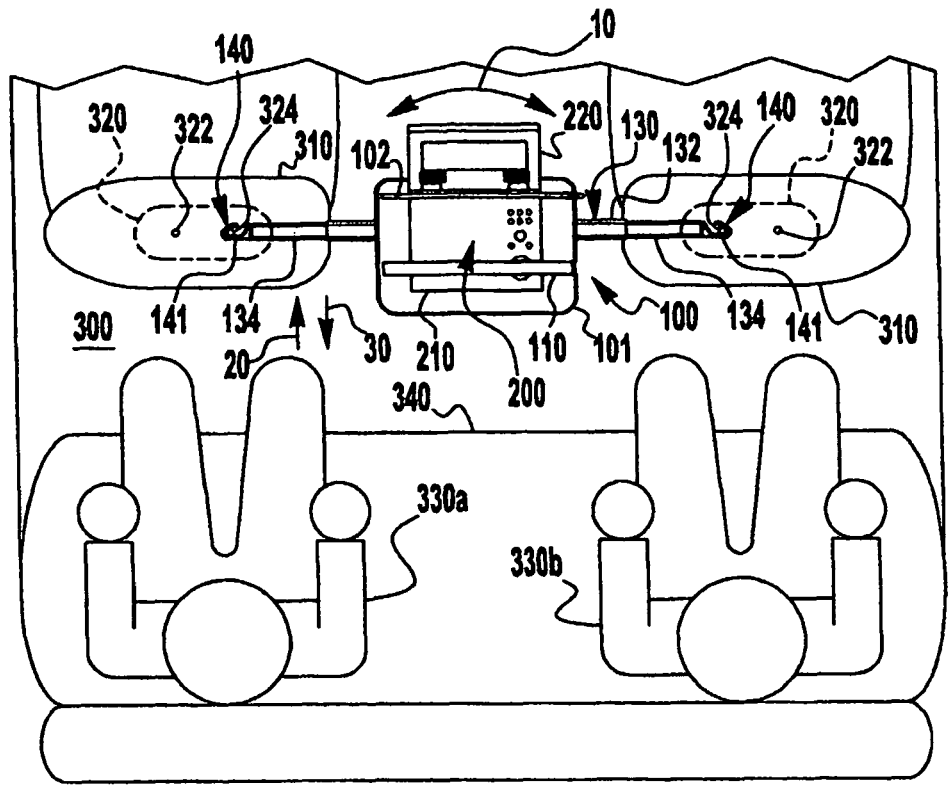
Figure 1B:
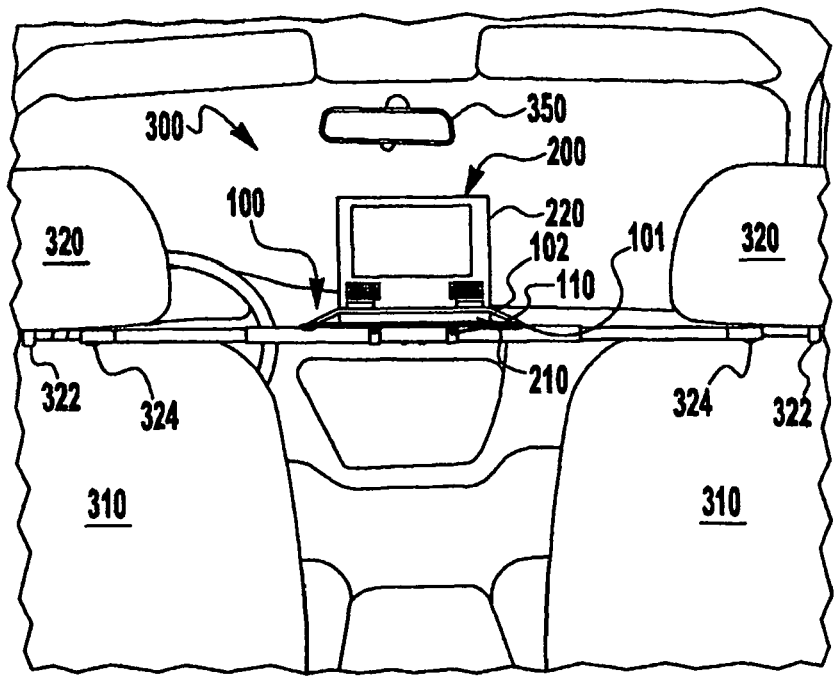
Figure 2A:
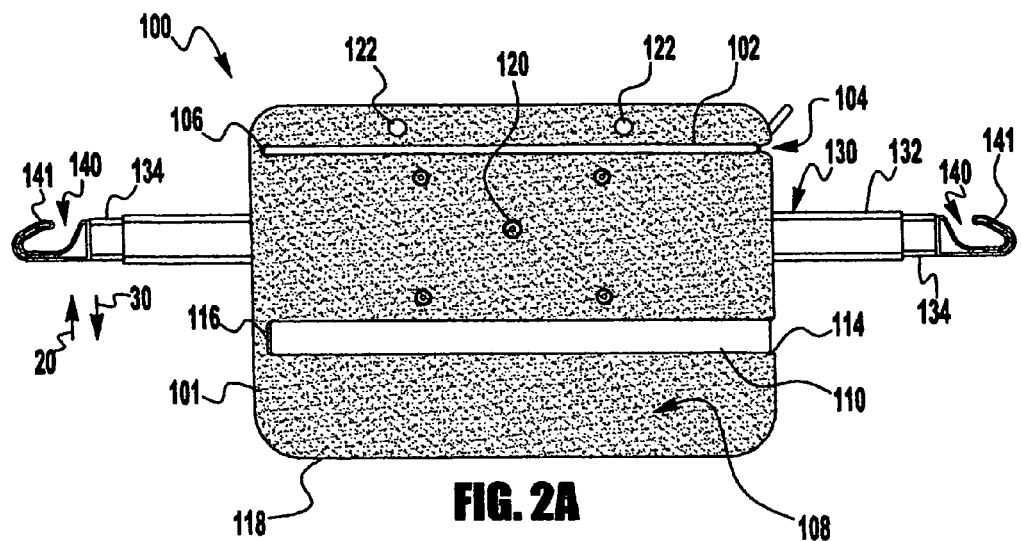
Figure 2B:
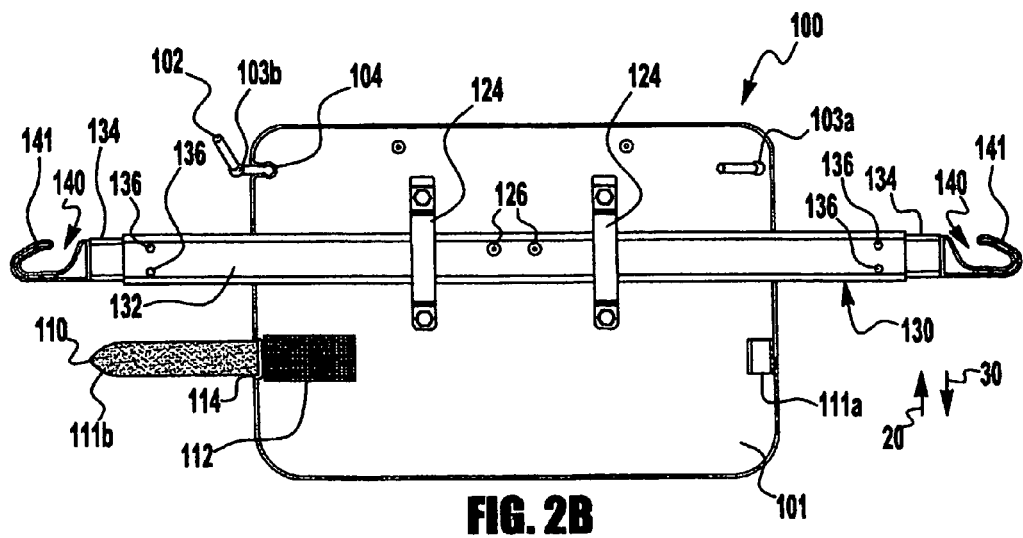
Figure 3A:
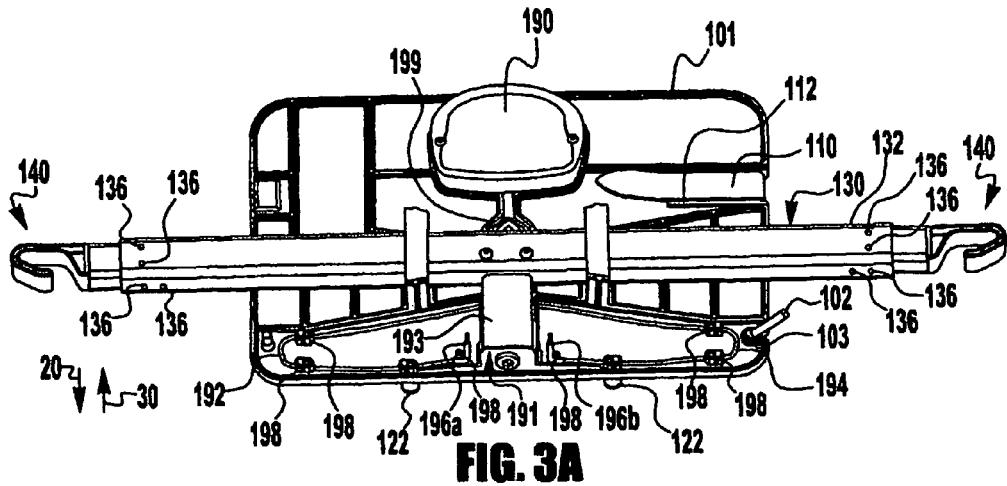
Figure 3B:
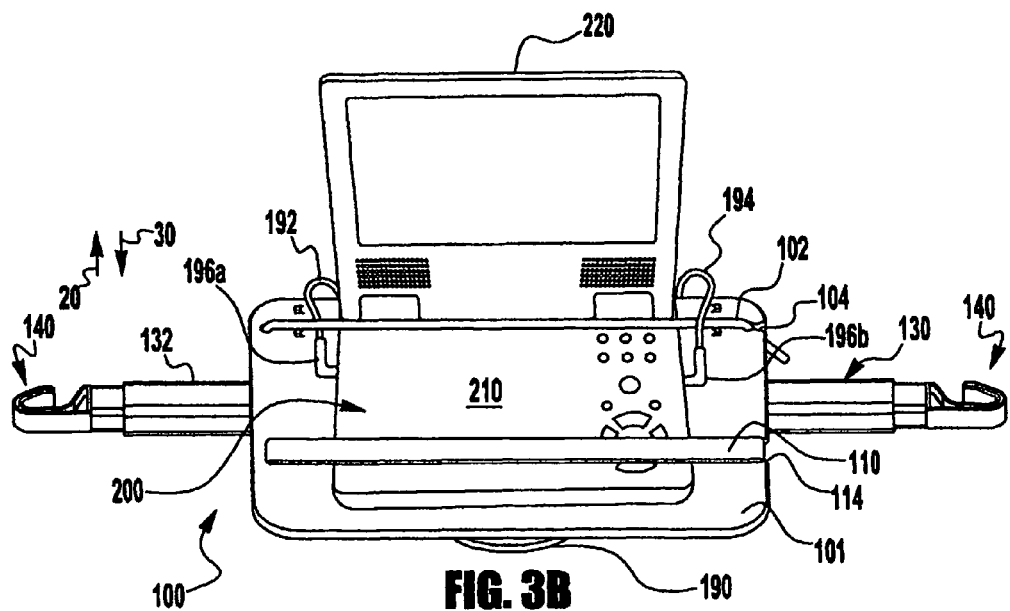
Figure 4:
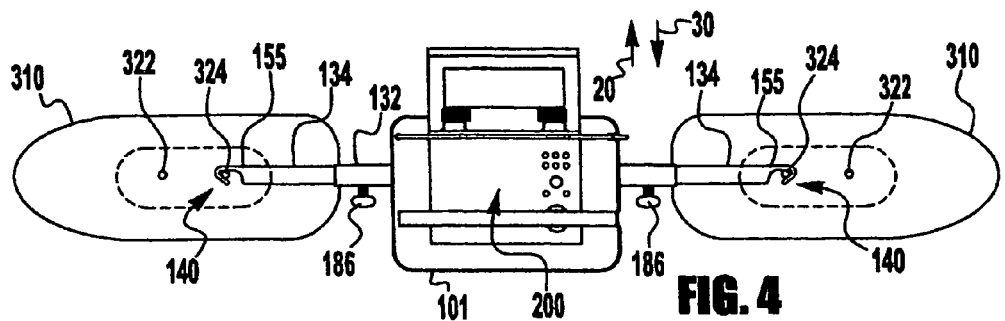
Figure 5A:
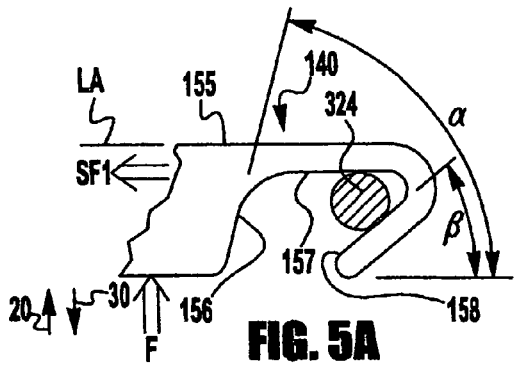
Figure 5B:
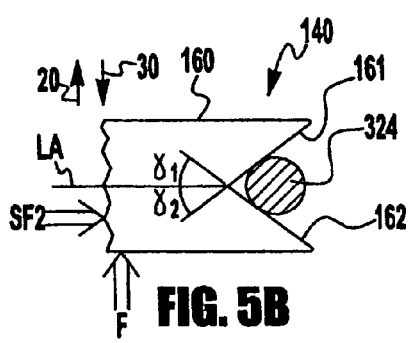
Figure 5C:
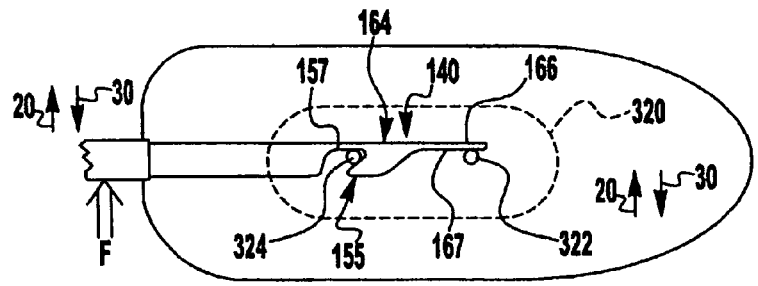
Figure 6:
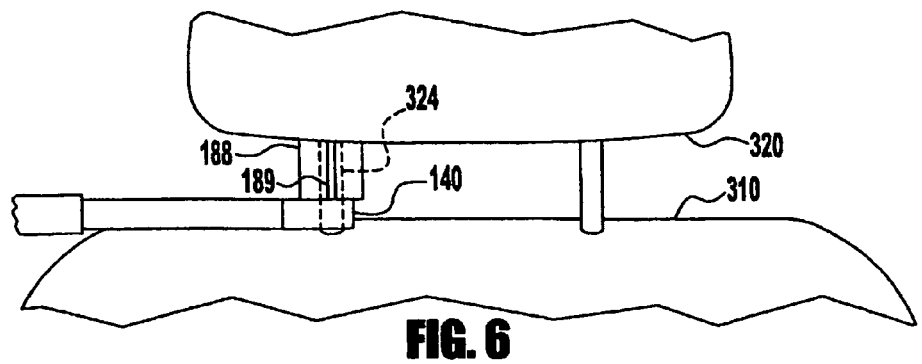
Figure 10A:
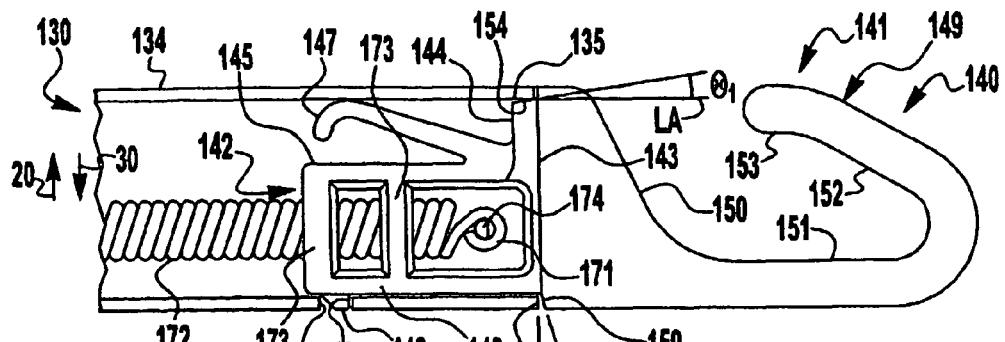
Figure 10B:
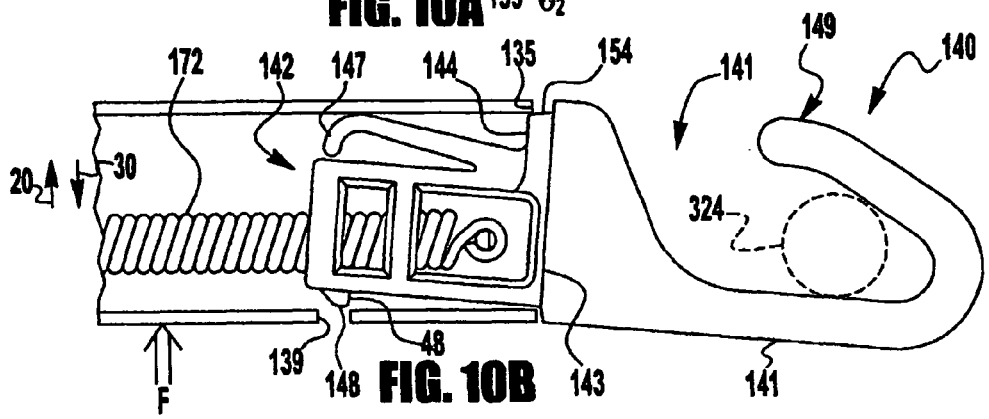
Figure 11:
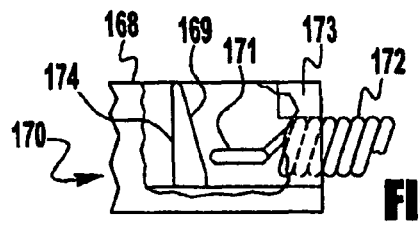
Figure 12:
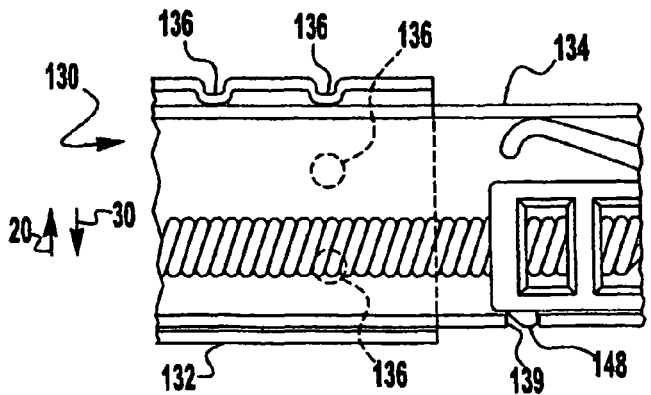

The structure, operation, and advantages of the present preferred embodiment of the invention will become further apparent upon consideration of the following description taken in conjunction with the accompanying drawings, wherein:

FIG. 1A is a top view of a vehicle equipment rack removably holding a player type of equipment and removably mounted in a vehicle wherein headrests are ghosted for clear viewing of the rack, according to the invention;

FIG. 1B is a rear view within the vehicle of FIG. 1, showing the vehicle equipment rack removably holding the player equipment and removably mounted in the vehicle, according to the invention;

FIG. 2A is a top view of the vehicle equipment rack of FIG. 1, according to the invention;

FIG. 2B is a bottom view of the vehicle equipment rack of FIG. 1, according to the invention;

FIG. 3A is a bottom perspective view of an alternative embodiment of the vehicle equipment rack, according to the invention;

FIG. 3B is a top perspective view of the vehicle equipment rack of FIG. 3A, removably holding a player type of equipment, according to the invention;

FIG. 4 is a top view of an alternative embodiment of the vehicle equipment rack removably holding the player equipment and removably mounted in the vehicle wherein the headrests are ghosted for clear viewing of the rack, according to the invention;

FIG. 5A is a top view of a portion of a rearward opening end hook embodiment removably mounted on a headrest post shown in cross-section, according to the invention;

FIG. 5B is a top view of a portion of an outward opening end hook embodiment removably mounted on a headrest post shown in cross-section, according to the invention;

FIG. 5C is a top view of a portion of a hook bar assembly having a rearward opening anti-rotation end hook embodiment removably mounted on two headrest posts of a vehicle seat wherein the headrest is ghosted for clear viewing, according to the invention;

FIG. 6 is a rear view of a portion of a hook bar assembly removably mounted along with a compression sleeve on a headrest post (hidden) of a vehicle seat and headrest (portions shown), according to the invention;

FIG. 7 is a top view of a partially disassembled embodiment of a hook bar assembly, according to the invention;

FIG. 8A is a magnified top view of a spring carrier portion of the hook bar assembly of FIG. 7, according to the invention;

FIG. 8B is a view of the forward side of the spring carrier portion of FIG. 8A, according to the invention;

FIG. 9 is a top X-ray view of the hook bar assembly of FIG. 7, assembled and with the right-hand portion fully extended, wherein a shelf is ghosted in for reference, according to the invention;

FIG. 10A is a top X-ray view of an end hook and a socket portion of the hook bar assembly of FIG. 9, according to the invention;

FIG. 10B is a top X-ray view of the end hook and socket portion of FIG. 10A, wherein the end hook is tilted in the socket, and a headrest post is ghosted in for reference, according to the invention;

FIG. 11 is a magnified cutout view of the rearward side of a portion of the spring carrier of FIG. 8A showing details of a spring attachment, according to the invention; and FIG. 12 is a top X-ray view of portions of a hook bar assembly embodiment having tolerance bumps visible on a forward side and hidden on a bottom side, according to the invention.

DETAILED DESCRIPTION OF THE INVENTION

FIGS. 1A and 1B show an exemplary usage of a preferred embodiment of an inventive vehicle equipment rack 100, the rack 100 being further illustrated, for example, in FIGS. 2A and 2B. A suitable vehicle 300 comprises any vehicle with one or more front seats 310 having two headrests 320 that are each supported by at least one supporting post 322, 324, and one or more rear seats 340. The front seat(s) 310 and rear seat(s) 340 can be single person (e.g., "bucket") or multi-person (e.g., "bench") seats, and there can be more than one row of rear seats 340. As will be learned from the description hereinbelow, the preferred embodiment of the invention, with an end hook 140 in the form of a pop-off forward opening hook 141 as illustrated (also see, for example, FIG. 10A), is best employed in vehicles 300 having a pair of front seat headrests 320, each having at least one support post (e.g., an inside support post 324) that is round in cross-section. However, the invention is adaptable for removable mounting on other post cross-sections (e.g., rectangular bar) through simple variations in the shape of the hooked portion of the end hook 140. Furthermore, with reference to FIG. 5C (described hereinbelow) an end hook embodiment is disclosed that has an anti-rotation hook 164 which requires both headrests 320 to have two support posts: an inside support post 324 and an outside support post 322. It should be apparent that the terms "front" and "rear" are used herein as relative terms; therefore the inventive vehicle equipment rack 100 could equally well be removably mounted on, for example, headrests of a first row of rear seats for viewing by occupants of a second row of rear seats, thereby making the first row the "front seats" relative to the second row of rear seats. In general the "forward" direction (indicated by a forward direction arrow 20 pointing toward the front of the vehicle 300) and the "rearward" direction (indicated by a rearward direction arrow 30 pointing toward the rear of the vehicle 300) are to be understood in the context (frame of reference) of directions within a vehicle 300 that apply to the equipment rack 100, its components, and any equipment (e.g., player 200) held on the rack 100, when the rack 100 is mounted as designed between two headrests 320 in the vehicle 300. Likewise, the terms "top", "bottom" and the like are to be understood in the same context as the terms "forward" and "rearward".

Still referring to FIGS. 1A-2B, a display device (player) 200 is removably held on a shelf 101 of the rack 100 by a strap 110 and a bungee cord 102 for simultaneous viewing by one or more rear seat occupants 330, e.g., a left rear seat occupant 330a and a right rear seat occupant 330b. The player 200 is, for example, a DVD player having a base 210 and a folding screen 220 that hingedly folds at a hinge and is consequently adjustable in order to obtain the best vertical angle for optimum viewing by the rear seat occupant(s) 330. It will be seen that the shelf 101 is also rotatable (shown by pivot direction arrows 10) for achieving a desired horizontal angle for viewing by, for example, a single rear seat occupant 330a or 330b who may be seated off-center on one side of the vehicle 300. The horizontal and vertical angle adjustments can also be used to compensate for variations in the tilt and fore-aft positioning of the front seats 310.

In the preferred embodiment illustrated in FIGS. 1A-2B, the shelf 101 is pivotably attached to, and supported by, a hook bar assembly 130 comprising two sliding portions (sliding bars 134) that are telescopically engaged with a guide portion (guide tube 132), and hooked onto the two inside headrest support posts 324 by two end hooks 140 that are releasably attached on distal longitudinal ends of the hook bar assembly 130. The rack 100 is thus removably held in position by the hook bar assembly 130 that is hooked on the inside headrest posts 324 and rests on top of the front seat(s) 310. The preferred embodiment of the end hook 140 is a pop-off forward-opening hook 141 that pops off of the hook bar assembly 130 in response to impact from the rear. The height of a typical player's screen 220 when in use on the rack 100 is generally no higher than a headrest 320, and is therefore generally unobsructive of a driver's rear view mirror 350 line of sight. Furthermore, the equipment rack 100 is compact enough to allow front seat occupants a relatively unobstructed view of; and access to, rear seat occupants 330.

FIGS. 2A-2B show further details of the preferred embodiment of the vehicle equipment rack 100. The shelf 101 is pivotably attached to the hook bar assembly 130 by a pivoting connection that is, for example, a pivot screw 120 (preferably a shoulder bolt) that passes through the shelf 101 and the guide tube 132, preferably being affixed to a spring carrier 170 (see FIGS. 7-9) that is appropriately positioned within the guide tube 132. The spring carrier 170 may be further affixed within the guide tube 132 by optional centering screws 126 that can be employed to hold the hook bar assembly 130 together before it is assembled with the shelf 101. Pivoting of the shelf 101 relative to the hook bar assembly 130 is limited in extent by pivot stops 124 that are shown on both sides (optionally only one side) of the pivot screw 120. In the preferred embodiment, the pivot stops 124 are in the form of brackets that are dimensioned to hold the guide tube 132 against the shelf 101 with enough force to provide friction such that a selected horizontal rotation angle 10 of the shelf 101 will be held as selected during normal use of the equipment rack 100 in a traveling vehicle 300. It is within the scope of the invention to use other forms of pivot stop 124; for example, the pivot stops 124 could be one or more appropriately placed protrusions from the shelf 101. It is also within the scope of the invention to use the bracket form of pivot stop 124 to movably attach the shelf 101 to the hook bar assembly 130 without using the pivot screw 120. It is also within the scope of the invention to attach the shelf 101 to any portion of the hook bar assembly 130 and optionally in a way that is not pivotable, including for example, molding the shelf 101 and the guide tube 132 together as a unitary construction.

Several elements of the rack 100 are utilized to removably hold equipment (e.g., player 200) in position on the shelf 101. The top surface of the shelf 101 is preferably a non-slip surface 108. For example, the surface 108 is roughened; for example the surface 108 is coated with a resilient material; for example self adhesive pads of hook and loop fabric (e.g., Velcro) are adhered to the surface 108 and to the bottom of the player 200. The bungee cord 102 is a commercially available elastic "shock cord" that has a knot 103 near each end, a first knot 103a attaching the bungee cord 102 to the shelf 101 by preventing passage of the bungee cord 102 through a hole 106 near one side edge of the shelf 101. A second knot 103b catches in a cord notch 104 that opens outward in an opposed side edge of the shelf 101. The second knot 103b is formed in a way that leaves sufficient extra cord length—e.g., one inch (2.5 cm)—to allow grasping of the end of the bungee cord 102 beyond the second knot 103b. The strap 110 is a thin, flexible, fabric strap with a hook-and-loop material (e.g., Velcro, preferably the loop material) on the side facing the shelf 101. The strap 110 is attached to the shelf 101 by having folds stitched in one end 111*a* for preventing further passage of the strap 110 through a slot 116 in a first side edge of the shelf 101. On the bottom surface of the shelf 101, a fastening pad 112 made of a corresponding hook-and-loop material (e.g., Velcro, preferably the hook material) is affixed near to a strap notch 114 that is indented into a second side edge of the shelf 101, opposite to the first side edge. A second end 111*b* of the strap 110 is extended long enough to accommodate wrapping over anticipated player bases 210, latching on the fastening pad 112, and extending beyond the fastening pad a sufficient length—e.g., one inch (2.5 cm)—to allow grasping of the second end 111*b* where it extends beyond the attachment pad 112. One or more retaining posts 122, preferably covered with a resilient material, protrude upward near a forward edge of the shelf 101. Thus a player 200 resting on the shelf 101 is specifically restrained from forward movement by the retaining posts 122, and is more generally restrained from movement by the strap 110 and the bungee cord 102, optionally in conjunction with the non-slip surface 108. In the case of players 200 having a screen 220 that hingedly folds up from a hinge along the forward edge, the player 200 is effectively trapped between the retaining posts 122 against the forward edge of the player 200 and the bungee cord 102 against the rear of the screen 220. The retaining posts 122 could be any form of restraining upward protrusion, e.g., a lip along the front edge of the shelf 101, but a peg-like shape is preferred in order to minimize interference with cords, receptacles, switches, etc. that may be present on the front edge of the player 200. The player 200 can be moved sideways to avoid interference with a retaining post 122, and/or the retaining posts 122 may be movable (e.g., in a slot) or removable (e.g., unscrewed).

Optionally, the rearward edge 118 of the shelf 101 (possibly extending around rear portions of the side edges) can be softened for cushioning the impact of a rear seat occupant 330 who may bump into a mounted equipment rack 100. The softened edge may comprise, for example, a thinned and curved flexible plastic edge, or for example, a resilient foam cushion.

FIGS. 3A and 3B show an alternative embodiment of the equipment rack 100 wherein optional features have been added to create a "premium model". FIG. 3B also illustrates, in a perspective view, an exemplary player 200 (a DVD player with a fold-up screen 220) removably mounted on the equipment rack 100 according to the invention. It may be noted that some of the player's control buttons are covered by the strap 110, but this has not been found to be a problem since the strap 110 is preferably flexible enough to allow pushing a button through the strap 110, or if necessary, the strap 110 can be easily unhooked for operation of the controls and then re-hooked on the pad 112 afterwards. The illustrated shelf 101 is molded plastic. The player 200 rests on top of the shelf 101. The screen 220 is hingedly folded open and the bungee cord 102 wraps around the rear of the screen 220, thereby biasing the player 200 forward against the retaining posts 122 (visible in FIG. 3A). The strap 110 is pulled snugly over the top of the player base 210, wrapped around the shelf 101 guided by the strap notch 114, and removably adhered to the pad 112 underneath. The bungee cord 102 is stretched over the base 210, and held by the knot 103 in the cord notch 104. Thus the bungee cord 102 and the strap 110 cooperate to hold the base 210 of the player 200 down on the shelf 101.

The optional premium features include an audio transmitter 190 having an audio cord 194 with a suitable plug 196*b*, a power jack module 191 having a power cord 192 with a suitable plug 196*a*, and cord/plug keepers 198. The audio transmitter 190 is attached under the shelf 101 preferably a rearward portion suitable for transmitting rearward, and can be any suitable transmitter, e.g., IR (infrared). The audio cord 194 is connected between the audio transmitter 190 and an audio plug 196*b* for plugging into a player 200. The power jack module 191 is mounted on the shelf 101, preferably under a front portion of the shelf 101, and has cords (e.g., power cord 192) connecting it to the audio transmitter, if needed, and to a power plug 196*a* for plugging into a player 200.

The premium features are adaptable to allow, for example, the use of cordless headphones (e.g., IR, not shown) for receiving audio signals from the audio transmitter 190 (e.g., an IR transmitter) that communicates through the audio cord 194 which is plugged into an audio output jack of the player 200 using a suitable plug 196*b*. For example, a cord (not shown) that is plugged into a cigarette lighter of the vehicle can be plugged into a jack (receptacle) of the power jack module 191 for supplying electrical power to the player 200 through the power cord 192 which emanates from the power jack module 191 and is plugged into an external power jack of the player 200 using a suitable plug 196*a*. The power jack module 191 optionally includes circuitry 193 for power conversion and/or power conditioning. The power conversion circuitry 193 converts power from the car battery to one or more (optionally switch selectable) voltages as needed for various players 200 (i.e., any equipment suitable for holding on the equipment rack 100). The power conditioning circuitry 193 is for minimizing electrical "noise" that may be present in the power supplied by the vehicle 300. Grooves 199 are provided for routing and protecting the audio transmitter 190 wiring (e.g., audio cord 194), especially where it passes between the shelf 101 and the hook bar assembly 130. When the cords 192, 194 are not plugged into a player 200, the cords 192, 194 and their plugs 196 can be stored underneath the shelf 101 using suitably shaped and positioned cord/plug keepers 198, e.g., a combination of hook-shaped and/or peg-lice protrusions below the shelf 101.

Tolerance bumps 136 (to be discussed hereinbelow with reference to FIG. 12) are visible in FIGS. 2B and 3A near the longitudial outer ends of the guide tube 132.

Referring now to FIGS. 4 and 5A, an embodiment of end hook 140 is shown as a rearward opening hook 155. Also shown is a thumb screw 186 that screws through the guide tube 132 for pressing on the telescoping sliding bar 134. Exemplary uses for one or more manual clamping devices such as thumb screws 186 include: loose clamping for providing friction to control telescoping movement; and providing a manual clamping device for holding the hook bar assembly 130 in a fixed telescopic position, thereby providing a means for holding a fixed spacing between end hooks 140, and/or providing a means for positioning the guide tube 132 and shelf 101 side to side between the headrest posts (e.g., inside posts 324). Although using the thumb screws 186 to hold a fixed spacing would enable removable installation of the rack 100 between headrest posts 324 without a need for spring biasing, this is not a preferred use since it obviates the objective of releasable mounting in the vehicle 300.

The rearward opening hook 155 is shaped to provide inside walls including a base wall 156 at its inward end, a shank wall 157 extending longitudinally outward from the base wall 156, and a finger wall 158 extending from the outward end of the shank wall 157. The shank wall 157 is preferably approximately parallel to a longitudinal axis LA of the rearward opening hook 155, i.e., longitudinally straight The finger wall 158 is straight and is angled inward and rearward relative to the shank wall 157 such that round posts 324 of typical cross sectional diameters, e.g., up to 0.5" (1.3 cm), will have a single line of contact on each of the shank wall 157 and finger wall 158. A finger angle β is determined to work in conjunction with a tensile spring bias force SF1 (e.g., as provided by springs 172 shown in FIG. 7 for biasing the sliding bar 134 inward) such that the finger angle β is small enough to allow the spring bias force SF1 to hold the rearward opening hook 155 on the post 324 with a strapped-on player 200 during operation of the vehicle 300; and the finger angle β is large enough to allow the rearward opening hook 155 to release (i.e., to unhook) from the post 324 by being wedged longitudinally outward against the spring bias force SF1 by the post 324 when the rack 100 is impacted from behind with a forward-directed release force F such as may occur when a back seat occupant 330 bumps against the rack 100 (e.g., in a sudden stop of the vehicle 300). The magnitude of the release force F should be minimized in order to minimize the effect of the impact on the person supplying the release force (e.g., a rear seat occupant 330). Given these disclosed determining parameters, an appropriate finger angle β can be determined. An example of an appropriate finger angle β magnitude is approximately 40° for typical spring bias forces, e.g., a spring force SF1 magnitude of 2 pounds force (8.9 Newtons). The base wall 156 may be at a steeper base wall angle a as needed for guiding the post 324 into or out of the rearward opening hook 155.

FIG. 5B shows an embodiment of end hook 140 as an outward opening hook 160. The outward opening hook 160 is preferably V-shaped to provide inside walls including a forward finger wall 161 that extends forward and longitudinally outward, and a rearward finger wall 162 that extends rearward and longitudinal outward. The forward finger wall 161 and the rearward finger wall 162 are both straight, and are angled relative to each other such that round posts 324 of typical cross sectional diameters, e.g., up to 0.5" (1.3 cm), will have a single line of contact on each of the forward finger wall 161 and rearward finger wall 162. The forward finger 161 is sloped relative to a longitudinal axis LA of the outward opening hook 160 by a forward V-finger angle γ1, and the rearward finger 162 is sloped relative to the longitudinal axis LA by a rearward V-finger angle γ2. The rearward V-finger angle γ2 is determined to work in conjunction with a compressive spring bias force SF2 (e.g., as provided by a spring 172 that is a compression spring for pushing the sliding bar 134 longitudinally outward) such that the rearward V-finger angle γ2 is small enough to allow the spring bias force SF2 to hold the outward opening hook 160 on the post 324 with a strapped-on player 200 during operation of the vehicle 300; and the rearward V-finger angle γ2 is large enough to allow the outward opening hook 160 to release (i.e., to unhook) from the post 324 by being wedged longitudinally inward against the spring bias force SF2 by the post 324 when the rack 100 is impacted from behind with a forward-directed release force F such as may occur when a back seat occupant 330 bumps against the rack 100 (e.g., in a sudden stop of the vehicle 300). The magnitude of the release force F should be minimized in order to minimize the effect of the impact on the person supplying the release force (e.g., a rear seat occupant 330). Given these disclosed determining parameters, an appropriate rearward V-finger angle γ2 can be determined. An example of an appropriate rearward V-finger angle γ2 magnitude is approximately 40° for typical spring bias forces, e.g., a spring force SF2 magnitude of 2 pounds force (8.9 Newtons). In other words, the V-finger angle γ2 magnitude is approximately equivalent to the finger angle β magnitude. Preferably the forward V-finger angle γ1 is equal to the rearward V-finger angle γ2, thereby also allowing release of the rack 100 due to similar impact forces from the front of the rack 100.

FIG. 5C shows an embodiment of end hook 140 as an anti-rotation hook 164 that includes a rearward opening hook 155 with a shank wall 157 as described hereinabove with reference to FIG. 5A. In addition, an anti-rotation bar 166 extends outward from the rearward opening hook 155 such that a bar wall 167 is parallel to, and approximately collinear with, the shank wall 157. The anti-rotation bar 166 is dimensioned to be long enough to reach just beyond (outward of) the outside headrest post 322 when the rearward opening hook 155 of the anti-rotation hook 164 is hooked on the inside headrest post 324. Thus, if a forward directed impact force F causes the end hook 140 on a first headrest 320 to release, then the anti-rotation bar 166 on a second headrest 320 will be levered rearward against the second headrest's outside headrest post 322, thereby preventing rotation of the rack 100 around the second headrest's inside headrest post 324.

FIG. 6 illustrates an optional resilient compression sleeve 188 being used to trap the end hook 140 between a headrest 320 and a seat 310, thereby providing sufficient downward force to minimize vertical rocking, rattling, or similar undesirable movement of the rack 100 that could occur when the end hook 140 is hooked on a post 324 of a headrest 320 that is raised up above the end hook 140. The compression sleeve 188 is a tube advantageously made of a resilient material that is significantly compressible, and has a cut 189 through the tube wall extending the entire length of the compression sleeve 188 such that the compression sleeve 188 can be removably hooked on the post 324 by passing the post 324 through the cut 189. The cut 189 can be any shape including, for example, linearly vertical (as shown), and for example, spiral.

FIG. 7 illustrates details of a preferred embodiment of the hook bar assembly 130. For better viewing of internal elements, the hook bar assembly 130 is partially disassembled such that the guide tube 132 is moved to the side of the rest of the hook bar assembly 130, and the end hooks 140 are separated (released) from the sliding bars 134. The guide tube 132 is tubular, preferably with a rectangular, rounded corner, cross-section, preferably wherein the fore-aft dimension is larger than the top-bottom dimension. A fist sliding bar 134a is telescopically engaged with the left side of the guide tube 132, and a second sliding bar 134b is telescopically engaged with the right side of the guide tube 132 (the first and second sliding bars 134a, 134b being collectively referred to as sliding bars 134). The sliding bars 134 are tubular with the same cross-sectional shape as the guide tube 132, but dimensioned to slide longitudinally within the guide tube 132. An end hook 140, preferably in the form of a pop-off forward opening hook 141, is releasably positioned in a socket 135 at the outer end of each sliding bar 134. For clarity, the end hooks 140 are shown released, i.e., popped off, from the sockets 135 of the sliding bars 134.

The two end hooks 140 are biased with respect to each other by two springs 172 (e.g., coiled tension springs), each of which is attached at one end to one of the end hooks 140, and at the other end to a spring carrier 170. The spring carrier 170 is preferably held at the longitudinal center of the guide tube 132 by a screw (preferably the pivot screw 120) that passes through a pivot screw hole 133 and a carrier pivot hole 176. Also held by the spring carrier 170 is an extension limiter 178 that works in cooperation with limit pins 138 that are secured near a longitudinal inward end of each of the sliding bars 134. For example, the limit pin 138 is a metal rod that passes through holes in top and bottom sides of the sliding bar 134.

The hereindescribed preferred embodiment of hook bar assembly 130 comprises two sliding portions (sliding bars 134) that are telescopically engaged with a guide portion (guide tube 132) that is tubular such that the sliding bars 134 longitudinally slide within the guide tube 132. However, it may be noted that "telescopic engagement" includes many functionally equivalent variations, all within the scope of this invention. For example, the sliding bar 134 can be tubular and sized to encompass the guide tube 132, which could be solid or hollow (tubular). For example, the sliding bar 134 can be telescopically engaged with, but adjacent to, the guide tube 132 by means of a dovetail-mortise arrangement.

It should be obvious that biasing of the end hooks 140 with respect to each other could take alternative forms including, for example: no pivot screw 120 or centering screws 126 so that the spring carrier 170 floats within the guide tube 132 between two springs 172; for example no spring carrier 170 and a single spring 172 extending between the end hooks 140 or sliding bars 134; for example one or more springs 172 that are either compression springs for biasing the end hooks 140 outward/apart, or tension springs for biasing the end hooks 140 inward/together.

It is within the scope of the invention for there to be only one sliding bar 134 (preferably tubular, but could be solid) such that one end hook 140 is at the outward end of the one sliding bar 134 and the other end hook 140 is at the distal outward end of the guide tube 132. Optionally, the end hooks 140 can be positioned in a socket 135 of; or formed as a part of; the longitudinally outward end of a sliding bar 134 or a guide tube 132.

FIGS. 8A and 8B show more details of the internal components of the hook bar assembly 130, and FIG. 9 is an X-ray view of the hook bar assembly 130 with the left-hand first sliding bar 134a filly retracted and the right-hand second sliding bar 134b fully extended. The spring carrier 170 has eyelet posts 174 for attaching the springs 172 to the spring carrier 170. An eyelet 171 is on the end of the spring 172 such that the spring 172 passes through an opening 173 of the spring carrier 170, and the eyelet 171 loops around the eyelet post 174. In the cutout view of FIG. 11, it can be seen that the eyelet post 174 is preferably a cylinder with a slanted side such that when the spring 172 is pushed into the opening 173, the eyelet 171 will ride up the slanted side 169 and then spring down into place over the eyelet post 174. The highest point of the eyelet post 174 is even with a top surface 168 of the spring holding component (e.g., the spring carrier 170) so that the eyelet 171 cannot slip off of the eyelet post 174 once the component (e.g., 170) is assembled within a tube (e.g., the guide tube 132).

Two holding fingers 175 hook over the extension limiter 178 to hold it to the spring carrier 170; and a cog 177 engages with a notch 179 in the extension limiter 178 to prevent longitudinal movement of the extension limiter 178 relative to the spring carrier 170. For assembly purposes, the extension limiter can be pushed sideways under the holding fingers 175 through their open ends. At each end of the extension limiter 178 there is a limiter hook 180. As shown in FIG. 9, the fully retracted left sliding bar 134a is stopped up against the spring carrier 170 and the extension limiter 178 extends outward from the spring carrier 170, between a left limit pin 138a and the inside of the left sliding bar 134a, to a left limiter hook 180a. Extension of the fully extended right sliding bar 134b is limited because a right limit pin 138b is stopped against a right limiter hook 180b. The extension limiter 178 extends outward from the spring carrier 170, between the right limit pin 138b and the inside of the right sliding bar 134b, to the right limiter hook 180b. The length of the extension limiter 178 from the spring carrier 170 (as determined by the notch 179) to the limiter hook 180 is fixed to work with the position of the limit pin 138 such that the sliding bar 134 cannot extend outward any farther than desired, but not so long as to bump into other internal components of the hook bar assembly 130 (e.g., the end hook 140).

The shelf 101 (ghosted in place) can be seen to be pivotably attached via the pivot screw 120 in the carrier pivot hole 176. The retaining posts 122 are near the front of the shelf 101, and the end hooks 140 of the preferred embodiment are pop-off forward opening hooks 141.

Alternate embodiments of the extension limiter 178, limit hooks 180, and limit pins 138 may include a longitudinal groove or slot cut into either one of the guide tube 132 and sliding bar 134, combined with a corresponding protrusion or pin on the other one of the guide tube 132 and sliding bar 134, wherein the protrusion travels in the groove or slot and is limit stopped at each end of the groove or slot.

FIGS. 10A-10B show more details about the inventive pop-off forward opening hook 141, the preferred embodiment for the end hook 140. The pop-off forward opening hook 141 comprises a hook portion 149 and a peg 142 (peg portion) for inserting into a socket 135 in the outer end of the sliding bar 134, wherein the peg 142 and socket 135 are cooperatively structured such that the pop-off forward opening hook 141 will pop off of the sliding bar 134 in response to a forward directed impact force F. When this happens, however, the spring 172 will still hold the equipment rack 100 together, and will generally keep the hook portion 149 hooked on the post 324 so that the rack 100 and the equipment it holds (e.g., the player 200) will remain generally between the headrests 320 even though the impact force F will have been absorbed by allowing spring-moderated forward movement of the rack 100 in response. Furthermore, it can be seen that a popped-off hook 141 can be easily pushed back into the socket 135 to restore the equipment rack 100 to a normal operating condition (unless the impact force F has been sufficiently violent to damage the spring 172 or other rack 100 components).

The hook portion 149 is shaped to provide inside walls including a base wall 150 at its inward end, a shank wall 151 extending longitudinally outward from the base wall 150, a finger wall 152 extending from the outward end of the shank wall 151, and an optional tip wall 153 extending from the forward end of the finger wall 152. The shank wall 151 is preferably approximately parallel to a longitudinal axis LA of the pop-off forward opening hook 141, i.e., longitudinally straight. The finger wall 152 is straight and is angled inward and forward relative to the shank wall 151 such that round posts 324 of typical cross sectional diameters, e.g., up to 0.5" (1.3 cm), will have a single line of contact on each of the shank wall 151 and finger wall 152. The tip wall 153 is approximately parallel to the shank wall 151 in order to provide additional holding power if, for example, the rack 100 is unintentionally pushed rearward hard enough to cause the finger wall 152 to ramp along the post 324 to the forward end of the finger wall 152.

The hook portion 149 transitions to the peg 142 by a flange 143 of the hook portion 149 that is laterally dimensioned larger than the socket 135, and a shoulder 144 of the peg 142 that is laterally dimensioned to closely fit into the socket 135 everywhere around its perimeter except that a forward side 154 of the shoulder 144 is beveled inward and rearward (to less than a close fitting dimension) at a shoulder bevel angle θ1 relative to the longitudinal axis LA of the end hook 140. The flange 143 longitudinal abuts the socket 135 except at the rearward side 159 of the flange 143, the rearward side 159 being beveled outward and rearward at a flange bevel angle θ2 relative to the lateral plane (i.e., the plane normal to the longitudinal axis LA).

The peg 142 has one or more openings 173 (two are shown) and an eyelet post 174 for holding an eyelet 171 on the longitudinally outer end of the spring 172. A peg spring 147 extends forward and longitudinally inward from a forward wall 145 of the peg 142, for applying a rearward directed spring bias on the inward end of the peg 142. A protrusion 148 extends approximately perpendicularly rearward from a rearward wall 146 near the inward end of the peg 142. Although the inward side of the protrusion 148 can be any shape (but preferably beveled as shown), it is most preferable that a longitudinally outward side 48 be approximately perpendicular to the rearward wall 146 (i.e., perpendicular to the longitudinal axis LA of the pop-off forward opening hook 141) in order to catch on a mating latch hole 139 for releasably holding the peg 142 in the socket 135. The latch hole 139 is formed in a rearward wall of the socket 135 and is dimensioned to mate with the protrusion 148 when the shoulder 144 is fully inserted into the socket 135 such that the flange 143 abuts against the socket 135, as illustrated in FIG. 10A. The protrusion 148 and mating latch hole 139 thus form an embodiment of a catch system that releases the peg 142 in response to tilting it suitably.

FIG. 10B shows the amount of tilting of the peg 142 that is necessary to lever the protrusion 148 clear of the latch hole 139 so that the pop-off forward opening hook 141 can be longitudinal slid into or out of the socket 135 at the outer end of the hook bar assembly 130. The peg spring 147 biases the protrusion 148 into the latch hole 139, such that the peg spring's 147 rearward directed spring bias force must be overcome by a forward directed force F (e.g., from an impact by a rear seat occupant 330) in order for the peg 142, and therefore the pop-off forward opening hook 141, to be popped off of (released from) the hook bar assembly 130. The pop-off forward opening hook 141 is tilted by the force F because the force F is opposed by the inside headrest post 324 around which the hook portion 149 is hooked. The shoulder bevel angle θ1 is dimensioned to allow the forward side 154 of the shoulder 144 to clear the socket 135 when the peg 142 is tilted sufficiently to lever the protrusion 148 clear of the latch hole 139 as shown in FIG. 10B. For example, for a 2 mm wide shoulder 144 in a socket 135 that is 18 mm front to back inside dimension, the shoulder bevel angle θ1 is at least 5°. An equivalent effect can be obtained with a shoulder bevel angle θ1 of 0° when substantially the entire beveled forward side 154 is suitably recessed rearward. The flange bevel angle θ2 is dimensioned to allow the peg 142 to pivot on the line where a rearward portion of the shoulder 144 adjoins the flange 143 while the peg 142 is tilted sufficiently to lever the protrusion 148 clear of the latch hole 139. A suitable flange bevel angle θ2 can also be achieved by simply recessing the beveled rearward side 159 of the flange 143 away from the socket 135.

Although the forgoing description has been for a pop-off version of the end hook 140 that has an hook portion 149 comprising a pop-off forward opening hook 141, it should be apparent that other hook forms could similarly be embodied in the hook portion 149, for example the rearward opening hook 155, for example the outward opening hook 160, for example the anti-rotation hook 164.

FIG. 11 illustrates a preferred apparatus and method for attaching the spring 172 to the spring carrier 170 (and to the end hooks 140), and has been described hereinabove.

FIG. 12 illustrates a preferred method of eliminating looseness in the way the sliding bar 134 fits into the guide tube 132. The preferred material for the sliding bar 134 and the guide tube 132 is rectangular thermoplastic tubing. Since this material is generally extruded, the dimensional tolerance is relatively great, and to assure a smoothly telescoping fit, the inside tube must be dimensioned a significant amount smaller than the outside tube. Thus, in order to prevent rattling and other undesirable relative movement of the hook bar assembly 130 components, it is desirable to tighten up their fit. The tolerance bumps 136 are formed in two adjacent sides of the outer tube (e.g., the guide tube 132) by heating and pressing on portions of those sides after the inner tube (e.g., the sliding bar 134) is assembled within the outer tube (guide tube 132). In this way, only the excess amount of tolerance is eliminated. Preferably, the tolerance bumps 136 are formed near the longitudinally outward end of the guide tube 132, and are formed on the forward side (to avoid interference with the latch hole 139 and protrusion 148) and on the bottom side (for appearance sake). Alternatively, for example, the tolerance bumps 136 can be formed on the sliding bar 134 (which may be solid or tubular) to extend toward the guide tube 132.

It can be seen from the description hereinabove that the hook bar assembly 130 of the inventive vehicle equipment rack 100 provides a simple and effective way to provide a shelf 101 for removably mounting equipment (e.g., player 200) in a vehicle 300. The hook bar assembly 130 is expandable for accommodating the spacing between the inside headrest posts 324 of two headrests 320 in most vehicles 300. Given the teaching herein, a variety of end hooks 140 can be made for hooking the vehicle equipment rack 100 on the inside headrest posts 324, and several exemplary embodiments 141, 155, 160, 164 of end hooks 140 have been described, each with their own features and resultant advantages as detailed hereinabove. Also, the vehicle equipment rack 100 has been shown to be adaptable for a variety of inside headrest post 324 designs, both round and rectangular in cross-section, and for headrests 320 that have only a single (inside) headrest post 324.

In conclusion, an inventive vehicle equipment rack 100 has been disclosed that overcomes many limitations in prior art racks, thereby offering a novel and non-obvious vehicle equipment rack 100 that: is adaptable (hook bar assembly 130) for installation in virtually any vehicle 300 with adjustable headrests 320 on the front seat(s) 310; is simple and fast to install or remove (unhooks in a few seconds); is stable with a minimum of rattling and/or jiggling or other movement (angled hook walls 157/158, 161/162, 151/152; compression sleeve 188; tolerance bumps 136); is unobstructive of the driver's rear view mirror 350 line of sight and of the front seat occupants' view and access to rear seat occupants 330; has enhanced safety features for passengers 330 in case of sudden stops; compensates for most movements (tilt, fore-aft) of the front seats 310 even after installation; is compact and lightweight; is collapsible for storage (hook bar assembly 130); is optionally pivotable 10 (pivot screw 120) for positioning of an attached viewing screen 220; and is adaptable (strap 110, bungee cord 102) for holding a wide variety of commonly available players 200, particularly DVD players and the like having a folding screen 220.

Although the invention has been illustrated and described in detail in the drawings and foregoing description, the same is to be considered as illustrative and not restrictive in character —it being understood that mainly preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A removably mountable vehicle equipment rack for holding equipment between headrests within a vehicle that has a first and a second headrest on one or more seats, each headrest having at least one headrest post extending approximately vertically upward from the one or more seats; the vehicle equipment rack comprising:
a longitudinally extending hook bar assembly having a guide portion, and at least one longitudinally sliding portion telescopically engaged with the guide portion;
a generally planar equipment supporting shelf attached on the hook bar assembly such that the shelf intersects the hook bar assembly along a parallel longitudinal line and extends laterally from opposed sides of the longitudinal line;
two end hooks on distal longitudinally outward ends of the hook bar assembly, wherein one end hook is configured for hooking on a headrest post of the first headrest, and the other end hook is configured for hooking on a headrest post of the second headrest,
thereby removably mounting the vehicle equipment rack between the first and second headrest posts, supported by the seat;
at least one of the two end hooks further comprising two planar inside hook walls fixed orthogonal to the plane of the attached equipment support shelf such that the two inside hook walls form an acute angled V-shape that opens in a longitudinally inward or outward direction;
generally rectangular cross-sections for the guide portion and the at least one sliding portion where they are telescopically engaged; and
a spring connected for longitudinally biasing the two end hooks with respect to each other, and in the direction of opening for the V-shape of the inside hook walls of the at least one end hook;
thereby biasing the V-shaped planar inside hook walls of the at least one end hook against a respective headrest post when the vehicle equipment rack is removably mounted thereupon, which causes the V-shaped planar inside hook walls to be biased into approximately vertical alignment with the respective headrest post, making the shelf approximately horizontal, and
thereby opposing torque about a longitudinal axis of the hook bar assembly such as would be caused by weight of equipment supported thereabove on the shelf.

2. The vehicle equipment rack of claim 1, wherein the at least one end hook further comprises, when removably mounted, a laterally forward opening for the end hook such that the two planar inside hook walls further comprise:
a longitudinally straight shank wall that extends longitudinally outward from the hook bar assembly; and
a straight finger wall that extends from the longitudinally outward end of the shank wall, and that is angled forward and longitudinally inward relative to the shank wall.

3. The vehicle equipment rack of claim 1, wherein the at least one end hook further comprises, when removably mounted, a laterally rearward opening for the end hook such that the two planar inside hook walls further comprise:
a longitudinally straight shank wall that extends longitudinally outward from the hook bar assembly; and
a straight finger wall that extends from the longitudinally outward end of the shank wall, and that is angled rearward and longitudinally inward relative to the shank wall.

4. The vehicle equipment rack of claim 1, wherein:
the spring biases the two end hooks longitudinally outward
the at least one end hook has a longitudinally outward opening V-shaped hook such that, when removably mounted, the two planar inside hook walls further comprise:
a forward finger wall that extends laterally forward and longitudinally outward from the hook bar assembly, and a rearward finger wall that extends laterally rearward and longitudinally outward from the hook bar assembly.

5. The vehicle equipment rack of claim 1, further characterized by:
a limit pin that is secured in one of the sliding portion and the guide portion; and
an extension limiter with limit hooks that is attached to the other one of the sliding portion and the guide portion, and that is cooperatively engaged with the limit pin for limiting outward extension of the sliding portion.

6. The vehicle equipment rack of claim 1, further characterized by:
a tolerance bump that extends between the guide portion and the at least one sliding portion.

7. The vehicle equipment rack of claim 1, further characterized by:
a pivoting connection of the shelf to the hook bar assembly; and
pivot stops for limiting the extent of shelf pivoting.

8. The vehicle equipment rack of claim 1, further characterized by:
a retaining post that protrudes upward near a forward edge of the shelf;
an elastic cord that is attached near a first side edge of the shelf and has a knot at an end of the elastic cord that is removably caught in a cord notch in a second side edge of the shelf opposite to the first side edge, wherein the cord notch opens outward at the second side edge; and
a strap having a first end that is attached to a first side edge of the shelf, and having a second end with hook-and-loop material that removably attaches to a fastening pad with a corresponding hook-and-loop material, wherein the fastening pad is affixed near the second side edge of the shelf.

9. The vehicle equipment rack of claim 1, further characterized by:
a softened laterally rearward edge of the shelf.

10. The vehicle equipment rack of claim 1, further characterized by:
a compressible sleeve removably hooked on the headrest post and positioned to extend vertically between the end hook and a headrest supported by the headrest post:
thereby resisting vertical movement of the end hook.

11. The vehicle equipment rack of claim 1, further characterized by:
an audio transmitter; and
an audio cord that is connected between the audio transmitter and an audio plug for plugging into the equipment.

12. The vehicle equipment rack of claim 1, further characterized by:
a power jack module; and
a power cord that is connected between the power jack module and a power plug for plugging into the equipment.

13. The vehicle equipment rack of claim 12, wherein the power jack module is further characterized by:
power conversion circuitry.

14. The vehicle equipment rack of claim 12, wherein the power jack module is further characterized by:
power conditioning circuitry.

15. The vehicle equipment rack of claim 1, wherein:
the end hooks are biased longitudinally outward and open longitudinally outward.

16. The vehicle equipment rack of claim 1, wherein:
the end hooks are biased longitudinally inward; and
when removably mounted, an inside wall of the at least one end hook slopes laterally forward and longitudinally inward for removably and releasably holding the rack on the headrest post.

17. The vehicle equipment rack of claim 1, wherein:
the end hooks are biased longitudinally inward; and
when removably mounted, an inside wall of the at least one end hook slopes laterally rearward and longitudinally inward for removably and releasably holding the rack on the headrest post.

18. A vehicle equipment rack for removably holding equipment on a shelf that is removably mounted within a vehicle that has a first and a second headrest on one or more seats, each headrest having at least one headrest post, the vehicle equipment rack characterized by:
a hook bar assembly having a guide portion, and at least one sliding portion telescopically engaged with the guide portion, wherein the hook bar assembly is attached to the shelf;
two end hooks on distal longitudinally outward ends of the hook bar assembly, wherein one end hook is configured for hooking on a headrest post of the first headrest, and the other end hook is configured for hooking on a headrest post of the second headrest; and further wherein each of the two end hooks has a rearward opening hook with inside walls including:
a longitudinally straight shank wall that extends longitudinally outward; and
a straight finger wall that extends from the longitudinally outward end of the shank wall, and that is angled rearward and longitudinally inward relative to the shank wall;
a spring connected for biasing the two end hooks with respect to each other;
an anti-rotation bar extending longitudinally outward from the rearward opening hook such that a bar wall is parallel to, and approximately collinear with, the shank wall; wherein:
the anti-rotation bar is dimensioned to be long enough to reach at least longitudinally outward of an outside headrest post when the rearward opening hook is hooked on an inside headrest post.

19. A vehicle equipment rack for removably holding equipment on a shelf that is removably mounted within a vehicle that has a first and a second headrest on one or more seats, each headrest having at least one headrest post, the vehicle equipment rack characterized by:
a hook bar assembly having a guide portion, and at least one sliding portion telescopically engaged with the guide portion, wherein the hook bar assembly is attached to the shelf;
two end hooks on distal longitudinally outward ends of the hook bar assembly, wherein one end hook is configured for hooking on a headrest post of the first headrest, and the other end hook is configured for hooking on a headrest post of the second headrest;
a spring connected for biasing the two end hooks with respect to each other;
a socket on the hook bar assembly that opens longitudinally outward;
a latch hole in a lateral inside surface of the socket;
a hook portion of the end hook;
a peg portion of the end hook extending longitudinally inward from the hook portion wherein the peg portion is configured to fit within the socket;
a flange of the hook portion where the hook portion joins the peg portion, wherein the flange is laterally dimensioned larger than the socket;
a shoulder of the peg portion adjacent to the flange wherein the shoulder is laterally dimensioned to closely fit within the socket;
a first lateral wall of the peg portion that is recessed relative to the socket;
a peg spring extending from the first lateral wall, and configured for biasing apart the first lateral wall and the socket when the peg portion is positioned in the socket; and
a protrusion extending laterally from a second lateral wall of the peg portion that is laterally opposed to the first lateral wall, wherein the protrusion is dimensioned and shaped for mating with, and catching in, the latch hole, and the latch hole is positioned to catch the protrusion when the peg portion is inserted into the socket such that the flange longitudinally abuts the socket.

20. The vehicle equipment rack of claim 19, further characterized in that:
the end hook has a forward opening hook portion;
the first lateral wall of the peg portion faces forward;
the second lateral wall of the peg portion faces rearward; and
a spring is connected for biasing the end hook longitudinally inward.

21. The vehicle equipment rack of claim 20, further characterized in that:
the shelf is attached to the guide portion;
the guide portion is a tube having a rectangular cross-section;
two sliding portions are the two distal longitudinally outward ends of the hook bar assembly; and
both of the two sliding portions have rectangular cross sections and are telescopically engaged for sliding longitudinally within the guide portion.

* * * * *